United States Patent [19]  
Millar

[11] Patent Number: 4,896,356  
[45] Date of Patent: Jan. 23, 1990

[54] SUB-BAND CODERS, DECODERS AND FILTERS

[75] Inventor: Paul C. Millar, Felixstowe, England

[73] Assignee: British Telecommunications public limited company, United Kingdom

[21] Appl. No.: 672,234

[22] Filed: Nov. 16, 1984

[30] Foreign Application Priority Data

Nov. 25, 1983 [GB] United Kingdom ............... 8331512
Feb. 27, 1984 [GB] United Kingdom ............... 8405090

[51] Int. Cl.$^4$ .............................................. H04B 1/66
[52] U.S. Cl. ................................................. 381/29
[58] Field of Search ................................ 381/29–33, 381/36–39, 40–45; 364/724, 724.01, 724.13, 724.17, 724.18; 328/165–167

[56] References Cited

FOREIGN PATENT DOCUMENTS 0143584 5/1988 European Pat. Off. .

OTHER PUBLICATIONS

Crochiere, Weber and Flanagan, "Digital Coding of Speech in Sub-bands", Bell System Technical Journal, vol. 55, pp. 1069–1085, Oct. 1976.
Esteban and Galand, "Application of Quadrature Mirror Filters to Split Band Voice Coding Schemes", IEEE ICASSP, 1977, pp. 191–195.
Crochiere and Penfield, "On the Efficient Design of Bandpass Digital Filter Structures", IEEE Trans. Acoustics, Speech, and Signal Processing, Aug. 1975, pp. 380–381.
Cheung and Winslow, "High Quality 16 kb/s Voice Transmission: The Subband Coder Approach", IEEE ICASSP, 1980, pp. 319–322.
Galand and Esteban, "16 KBPS Real Time QMF Sub-Band Coding Implementation", ICASSP, 1980, pp. 332–325.
Johnston, Crochiere and Goodman, "A Digital Sub-Band Coder for Speech Communication at 9.6 kb/s", 1977 Inter. Conf. on Communications (12–15 Jun. 1977), pp. 193–197.
Article from IEEE Transactions on Acoustics, Speech and Signal Process, vol. 36, No. 9, Sep. 1988, entitled "A New Approach to Recursive Mirror Filters with a Special Application in Subband Coding of Images", pp. 1496–1500.
The Bell System Technical Journal, vol. 60, Sub-Band Coding, by R. E. Crochier, pp. 1633–1653.
Sub-Band Coder Design Using Recursive Quadrature Mirro Filter, by A. Ramstad and Ole Foss, Signal Processing Theories and Applications, pp. 747–752.
"A Class of Infinite-Duration Impulse Response Digital Filters for Sampling Rate Reduction", by Horacio G. Martinez et al, IEEE Transactions on Acoustics, Speech, and Signal Processing, vol. ASSP-27, No. 2, Apr. 1979, pp. 154–162.

*Primary Examiner*—Gary V. Harkcom  
*Assistant Examiner*—John A. Merecki  
*Attorney, Agent, or Firm*—Nixon & Vanderhye

[57] ABSTRACT

A pair of filters ($H_1H_2$) split an input signal into two frequency sub-bands (defined by a transition frequency) which are down-sampled and coded: after sample rate restoration the signals are filtered ($K_1K_2$) and combined. To reduce signal delays, the delay response of each filter is non-constant, having a maximum at or beyond the transition frequency. Preferably non-quadrature filter pairs are used. Filters may be cascaded for more than two sub-bands.

13 Claims, 9 Drawing Sheets z- PLANE
x- POLES
o- ZEROS

SUB-BAND CODERS, DECODERS AND FILTERS

FIELD OF THE INVENTION

The invention relates to a transmission system having sub-band coders and decoders and the filters used therein.

BACKGROUND AND SUMMARY OF THE INVENTION SUB-BAND CODERS, DECODERS AND FILTERS

Mirror filters are used in subband coding (SBC) schemes. Subband coding has been shown to be an effective method of reducing the bit-rate required for the transmission of telephone band signals (R. E. Crochiere, S. A. Webber and J. L. Flanagan, "Digital coding of speech in subbands", Bell Sys Tech J. Vol. 55 pp 1069–1085 (1976 Oct)). It is a waveform coding technique that can cope with signals from a wide variety of sources, and could, therefore, prove useful in the public switched network. Coding efficiency is achieved by virtue of the fact that the individual subbands can be encoded using differing coding strategies, and these can be optimized to the statistics of the input signals. The method is especially applicable to speech transmission because the coders can be made to exploit certain perceptual effects connected with hearing. In particular, provided that appropriate quantizers are used, the technique will result in the quantization noise at the output of the codec having a similar power spectral distribution to that of the uncoded signal; it is well-known that the human ear is relatively tolerant to noise in the parts of the spectrum occupied by high level wanted signals. Additionally, the higher frequency components can be represented with reduced accuracy because the ear is less sensitive to their absolute content.

Reducing the number of bits does mean, however, that the measured quantization noise in the SBC channel will be of higher level than the channel noise of a normal telephone connection. Nevertheless, when using appropriate coding schemes, the subjective quality of the SBC output signal will remain good. In fact, listening tests suggest that transmission rates can be as low as 16 kbit/s before degradations become noticeable.

Unfortunately, simple tests, such as these, do not highlight problems that could occur during 2-way transmission, with all the additional impairments that can be expected within a telephone network. For example, there are many telephone connections which introduce propagation delays close to the CCITT recommended maximum (recommendation G122). If SBC systems are added to these circuits, and if the band-splitting filters introduce significant extra delay, then these connections could become prone to observable echoes. Non-blocking echo cancellation equipment will be of minimal use in these situations, because the cancellation algorithms behave poorly in the presence of high level channel noise. For this reason a study was carried out into the feasibility of building band-splitting filters that would result in SBC systems introducing less signal delay.

Prior proposals have employed quadrature mirror filters (QMF) with a linear phase response (i.e. a constant delay).

According to the present invention we provide a filter arrangement comprising a pair of first and second filters for passing respectively frequencies above and below a transition frequency, in which the amplitude responses and the delay responses of the filters are mirror images about the transition frequency, the filters are not quadrature filters and the delay response with respect to frequency of each filter is non-constant. Since the filters are not quadrature filters, the delay response is asymmetrical about the transition frequency.

In filters employing a linear phase response, the delay is not a minimum and delays add arithmetically in cascaded systems. The present proposal permits a reduction of the delay in each filter, and in multi-band cascaded systems the delay peaks can be arranged not to coincide in subsequent filters. Preferably the filters are minimum phase response filters (i.e. the z-plane plot contains no zeros outside the unit circle).

In the past, quadrature filters have been employed viz the phase shifts introduced by the two filters of the pair always differ by 90°. Recognizing, however, that this represents an unnecessary constraint, in the invention the first and second filters are not required to have a phase difference of 90°.

It is preferred that the peaks of the delay response of each filter lie beyond the transition frequency: in this way, in a system in which a signal is divided in a first pair of filters, subsampled, reconverted to the original sampling rate and filtered by a second pair, the peak delay of the signal path through the system can be less than that of the two channels considered separately.

The amplitude response of the system can be made arbitrarily flat—subject of course to constraints in terms of the number of filter stages permissible whilst meeting desired delay limits. The phase response of course will not be flat. For speech transmission this is relatively insignificant: for other applications, phase equalization can be employed as necessary.

Preferably the filters are recursive: although not essential, this is highly desirable from the practical viewpoint to reduce the number of delay stages.

In another aspect, the invention provides a sub-band coding apparatus having an input for a sampled input signal, first and second filters of the type described above arranged to filter the sampled signal, and means for down-sampling the filtered outputs; and also a decoding apparatus comprising means for restoring the sampling rates of sub-band input signals, first and second filters of the type described above for filtering the restored signals, and means for combining the filter outputs to produce a decoded signal.

The manner in which the samples may be encoded/decoded at the coder output/decoder input, in terms of the number of bits and coding schemes used, for providing a reduction in the transmitted bit rate is not material to the present invention and conventional techniques can be employed.

Of course, the use of only two sub-bands is the minimum case, and more sub-bands may be employed. Although it would be possible to employ band-pass filters for this purpose, cascaded filter pairs are more commonly used to divide the band of interest progressively into two, four, eight etc. sub-bands, and this method may be used in the context of the present invention.

Assuming Nyquist sampling at the input, it will normally be necessary to divide the band into two equal parts, so that, for a sampling rate $f_s$, with a system bandwidth of $f_s/2$, the transition frequency of the first filter pair would be $f_s/4$.

Preferably the filter parameters are selected such that the overall delay response of the system is, over a substantial portion of the system bandwidth, substantially equi-ripple (i.e. that the peak-to-peak ripple is substantially constant) and the spacing of the peaks of the delay response is substantially uniform. Generally these peaks will occur at the band transitions. As a consequence, equalization can readily be carried out by means of a relatively simple polyphase all-pass filter.

BRIEF DESCRIPTION OF THE DRAWINGS

Some embodiments of the present invention will now be described, by way of example, with reference to the accompanying drawing, in which.

DETAILED DESCRIPTION

The subbands in SBC schemes are usually contiguous so as to avoid dead-band regions in the final output signal. However, the design of such schemes is complicated by the fact that sampling-rate changes are necessary in order to achieve coding efficiency. As a result alias frequency components are generated, and these will cause gross distortion at the output, unless their contribution can be eliminated. Fortunately, Esteban and Galand have found a processing arrangement which guarantees alias cancellation at the band recombination node (D Esteban and C Galand, "Applications of quadrature mirror filters to split band voice coding schemes", in IEEE Int on Conf Acoust, Speech, Signal Processing, pp 191-195, Hartford, CT., 1977), and the analysis that they presented will be discussed here, in brief, in order to develop the argument for using the proposed class of filters.

Figure 1:
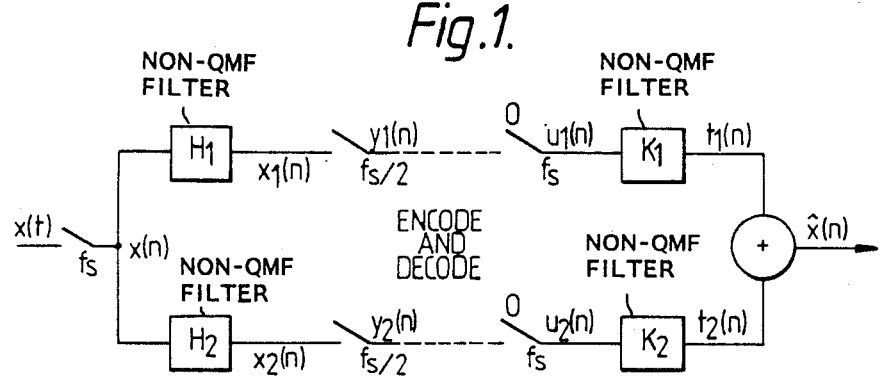
FIG. 1 is a block diagram of a coder and decoder according to the present invention.

FIG. 1 is the standard block diagram of a 2-band scheme. The band-limited input signal is sampled at a rate $f_s$, and separated into two subband components using NON-OMF filters $H_1$ and $H_2$. The resulting subband signals are then down-sampled to a rate $f_s/2$ before encoding for transmission. Using this strategy there is no net increase in the total number of signal samples/s. This is important because it means that no complicated sampling-rate transformations are involved. However, it must be remembered that, in practice, the band-splitting filters have overlapping transition bands, and will therefore pass signal components with frequencies above the new half-Nyquist value, and this will result in the generation of alias signal components.

At which the receiver, zero-valued samples are inserted between each received subband sample in order to restore the original sampling rate. This operation generates signal components in both the upper and lower quarter-Nyquist bands. Therefore, NON-OMF interpolation filters, $K_1$ and $K_2$, are required to confine each up-sampled subband component to its appropriate frequency spread. Again, the use of practical filters means that a proportion of alias signal components will be passed by each filter.

The conditions under which all aliases will cancel can be found by examining the composition of the final output signal x(n). The z-transform X(z) of this signal is given by the following expression:

$$X(z) = (1/2) \cdot [H_1(z) K_1(z) + H_2(z) K_2(z)] \cdot X(z) + \quad (1)$$

$$(1/2) \cdot [H_1(-z) K_1(z) + H_2(-z) K_2(z)] \cdot X(-z)$$

the X(-z) term in this expression represents the z-transform of the alias components. Thus aliases will not appear at the final output if $$H_1(-z)K_1(z) + H_2(-z)K_2(z) = 0 \quad (2)$$

The set of network responses that satisfy this condition can be reduced to a useful subset by specifying that the band-splitting be symmetrical about the frequency $f_s/4$, i.e. $H_1$ and $H_2$ have mirror image frequency and delay responses. This implies that $$H_1(z) = H_2(-z) \quad (3)$$

With this relationship, condition 2 will be satisfied if $$K_1(z) = H_1(z) \quad \ldots (4),$$

and $$K_2(z) = H_2(z) \quad (5)$$

Equations 3, 4 and 5, therefore, state a set of criteria that will result in alias-free output signals from this type of subband coder. There is nothing novel about this derivation, but it is reiterated here in order to remind the reader that any extra constraints that the designer applies to the filters are imposed for purposes other than ensuring alias-cancellation.

It is, therefore, worth considering the properties of various possible classes of filters with regard to their applicability to the requirements of a complete system. For example, SBC designs frequently incorporate quadrature mirror filter (QMF) pairs. Useful filters of this type can be synthesized relatively easily, because the quadrature phase relationship ensures that the magnitude response of equation 1 can be evaluated simply from the magnitude functions of $H_1(z)$ and $H_2(z)$. Another commonly-used approach is to apply the additional restriction of specifying $H_1$ and $H_2$ to be FIR (finite impulse response) networks with linear phase responses. This offers the advantages of an efficient processing structure and the signal delay being the same for all frequencies. In both of the above cases, however, the signal delays will be greater than the minimum achievable for a given filter amplitude response specification. Thus, in applications where signal delay is critical, the proposed class of minimum-phase recursive mirror filters could prove useful.

The class of recursive mirror filters (RMFs) to be described are intended for use in SBC schemes. They have the following features:

1. Their amplitude and phase relationships are as defined by equations 3, 4 and 5, hence alias-free signal reconstruction can be realized.
2. For a given amplitude characteristic the peak of signal delay at the output of the SBC systems incorporating these filters will be less than the corresponding delay introduced when using other published classes of filters.
3. For a given amplitude characteristics, the filters will be of lower order than other classes.
4. The filters can be realized in a way that is computationally efficient.

The delay response of SBC schemes incorporating these filters will not be flat. Peaks of delay will occur at the subband edges, and it will be shown later that this can be used to advantage in multiband configurations.

The efficiency in filter order with RMFs is a result of the fact that the transfer functions of the networks used have both poles and zeros of transmission. Recursive QMF pairs also have this property, and in addition, they can be designed to introduce less signal delay than their FIR equivalents. But, for minimum delay system responses, it is necessary to abandon the quadrature phase restrictions. There are no fundamental reasons why recursive mirror filter pairs should not be used in SBC schemes to fill this role. However, the procedure for their synthesis is more complicated than in the QMF case.

Equation 3 defines the mirror filter relationship, and equations 4 and 5 define conditions for alias-free signal reconstruction. Substituting these back into equation 1 we get the following expression for the transfer function of the SBC scheme:

$$F(z) = X(z)/X(z) = (\tfrac{1}{2}) \cdot [H_1^2(z)z - H_1^2(-z)] \quad (6)$$

Evaluating this for $z = e^{jwT}$, where $w$ is the angular frequency and $T$ is the sampling period, it can be seen that the amplitude requirements will be met if $$|[H_1^2(e^{jwT}) - H_1^2(e^{j(wt+\pi)})]| = 2, \quad (7)$$

and the delay requirements will be satisfied if $$d/dw \{\arg [H_1^2(e^{jwT}) - H_1^2(e^{j(wT+\pi)})]\} < D, \quad (8)$$

where D is the maximum permitted delay. (When using RMFs this maximum will occur when $wT$ has a value close to $\pm \pi/2$.)

The recursive nature of the proposed class of filters means that their transfer functions are of the form $$H(z) = N(z)/D(z) \quad (9)$$

where $N(z)$ and $D(z)$ are polynomials in $z$. Thus, substituting for $H_1(z)$ in equation 6 we get $$F(z) = 1/2 \frac{[N_1^2(z) D_1^2(-z) - N_1^2(-z) D_1^2(z)]}{[D_1^2(z) D_1^2(-z)]} \quad (10)$$

This is an unwieldly function with which to work, because the numerator term comprises both sums and products of complex polynomials. However, it was noted that, as we are primarily interested in the frequency/magnitude behavior of the system, the following expressions evaluated for $z = e^{jwT}$ could prove more useful:

$$|F(z)|^2 = \tfrac{1}{4}\left[\left|\frac{N_1(z)}{D_1(z)}\right|^4 + 2\left|\frac{N_1(z)}{D_1(z)}\right|^2 \left|\frac{N_1(-z)}{D_1(-z)}\right|^2 \cos\phi(z) + \left|\frac{N_1(-z)}{D_1(-z)}\right|^4\right] \quad (11)$$

where $\phi(z) = 2\{\arg[H_1(z)] - \arg[H_1(-z)]\} \quad (12)$

Equation 11 expresses the vector addition of the subband components at the recombination node, and $\phi(z)$ is the phase difference between the subband signals at this point. Using a similar approach, it was possible to obtain the following expression for the absolute phase shift $\pi(z)$ at the output:

$$\theta(z) = 2 \arg [H_1(z)] - \arctan\left\{\frac{|H_1(-z)|^2 \sin\phi(z)}{|H_1(-z)|^2 \cos\phi(z) + |H_1(z)|^2}\right\} \quad (13)$$

and the delay at a given $w$ is, therefore, the gradient of this expression at $w$.

Although equations 11, 12 and 13 look complicated, they are in fact extremely tractable, because the magnitude and phase components have been decoupled. This means that all the contributory elements can be evaluated separately, and then combined to give the complete system response. It was found that the procedure for optimizing the system response could be further simplified if $H_1(z)$ is decomposed into products of quadratics in $z$. In this way the individual poles and zeros of $H_1(z)$ can be easily identified and their positions controlled independently. For this reason $H_1(z)$ is written in the form $$H_1(z) = \prod_{i=1}^{M} \frac{1 + a_i z^{-1} + b_i z^{-2}}{1 + c_i z^{-1} + d_i z^{-2}} \quad (14)$$

where M is the total number of biquadratic sections. From this it follows that for $z = e^{jwT}$ $$|H_1(z)|^2 = \quad (15)$$

$$\prod_{i=1}^{M} \frac{(1 + a_i \cos wT + b_i \cos 2wT)^2 + (a_i \sin wT + b_i \sin 2wT)^2}{(1 + c_i \cos wT + d_i \cos 2wT)^2 + (c_i \sin wT + d_i \sin 2wT)^2}$$

-continued
and $$\arg[H_1(z)] = \qquad (16)$$

$$\sum_{i=1}^{M} \arctan[-(a_i \sin wT + b_i \sin 2wT)/(1 + a_i \cos wT + b_i \cos 2wT)] +$$

$$\sum_{i=1}^{M} \arctan[(c_i \sin wT + d_i \sin 2wT)/(1 + c_i \cos wT + d_i \cos 2wT)]$$

Using these functions it is possible to evaluate the constituent terms of equation 11, and then, by iteration, force the system amplitude response to exhibit arbitrarily small deviations from a constant value. An additional scaling factor can be applied to normalize the gain of the final output signal if required.

Non-quadrature recursive mirror filters have been synthesized using the above procedure, and their performances have been compared with bench-mark FIR QMF designs. In general, for a given amplitude specification, the order of the recursive networks will be about a quarter of that of their FIR equivalents. This means that the temporary storage requirements for their realization are approximately halved. Unfortunately, the abandonment of the quadrature criteria means that more multiplications per second are required for the new class of filters. However, this is offset to some degree by the fact that, because the filters are of much lower order, their responses are less sensitive to coefficient quantization.

Figure 2B:
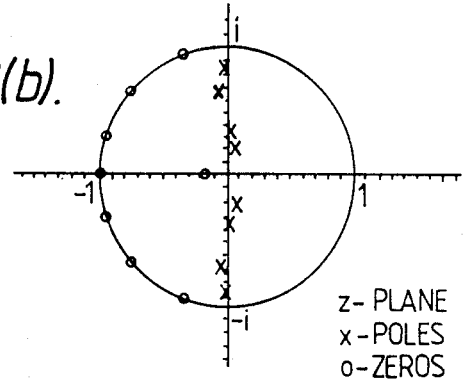
FIGS. 2a, 2b, and 2c are amplitude, pole-zero and delay plots of one example of a filter.
Figure 2A:
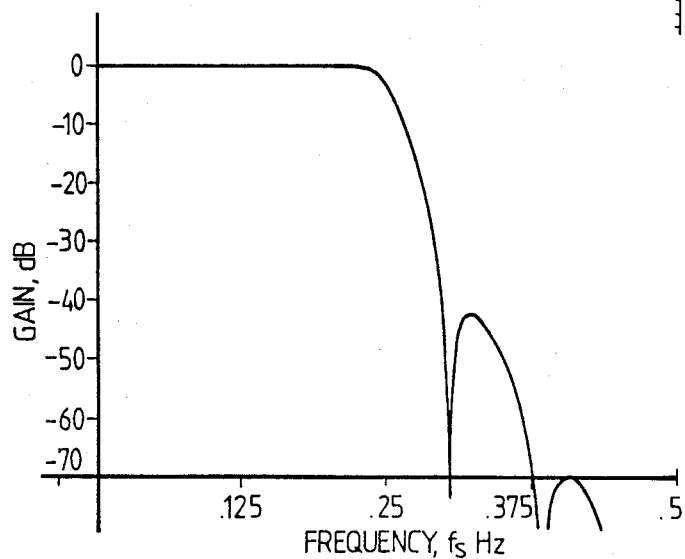
Figure 2C:
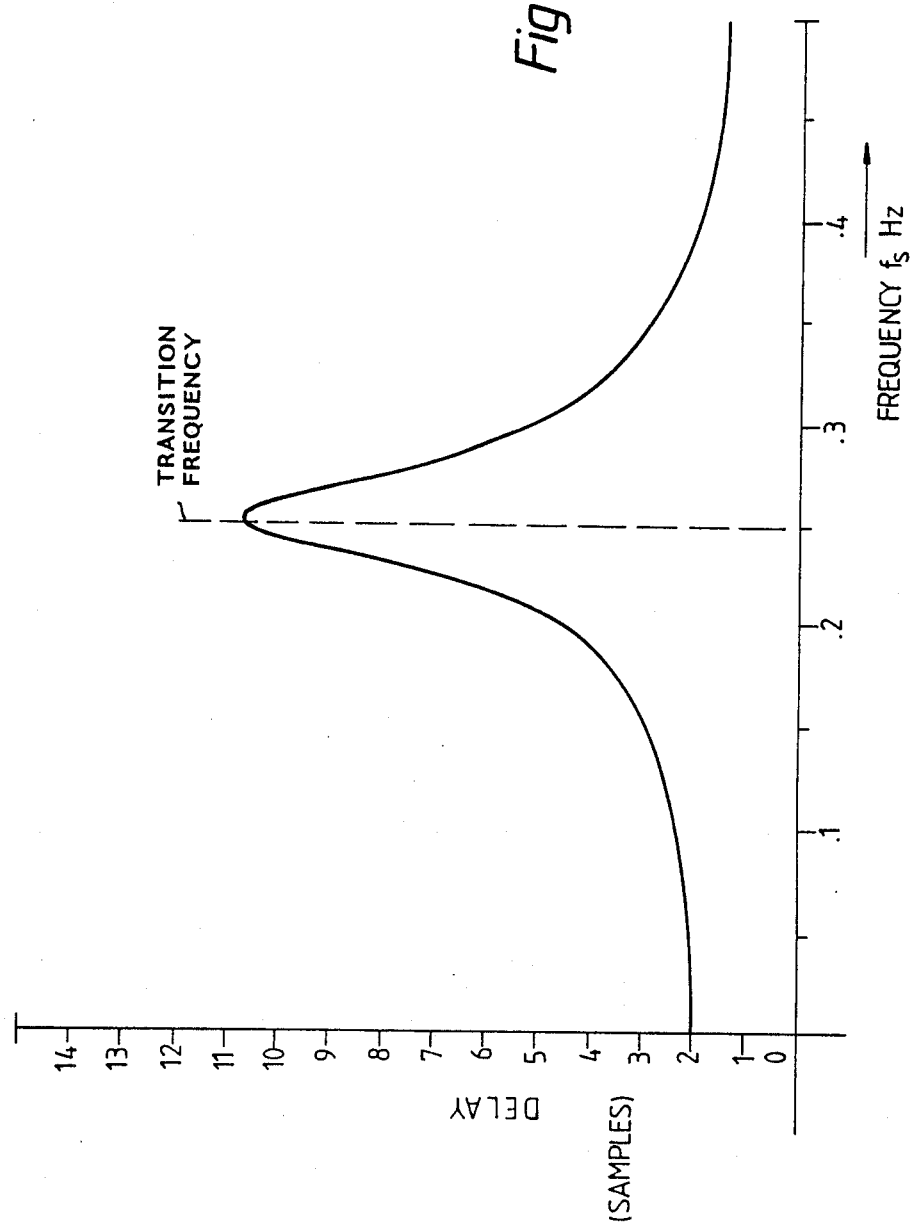

The amplitude/frequency response of an 8th-order, half-band recursive mirror filter is shown in FIG. 2(a), the FIG. 2(b) is a plot of the locations of the poles and zeros of its transfer function: its delay response is shown in FIG. 2(c). The coefficients are as follows:

| | |
|---|---|
| $a_1 = 0.68$ | $b_1 = 1.0$ |
| $a_2 = 1.90$ | $b_2 = 1.0$ |
| $a_3 = 1.50$ | $b_3 = 1.0$ |
| $a_4 = 1.172$ | $b_4 = 0.172$ |
| $c_1 = 0.020$ | $d_1 = 0.722$ |
| $c_2 = 0.117$ | $d_2 = 0.470$ |
| $c_3 = -0.020$ | $d_3 = 0.116$ |
| $c_4 = -0.118$ | $d_4 = 0.045$ |

Figure 3A:
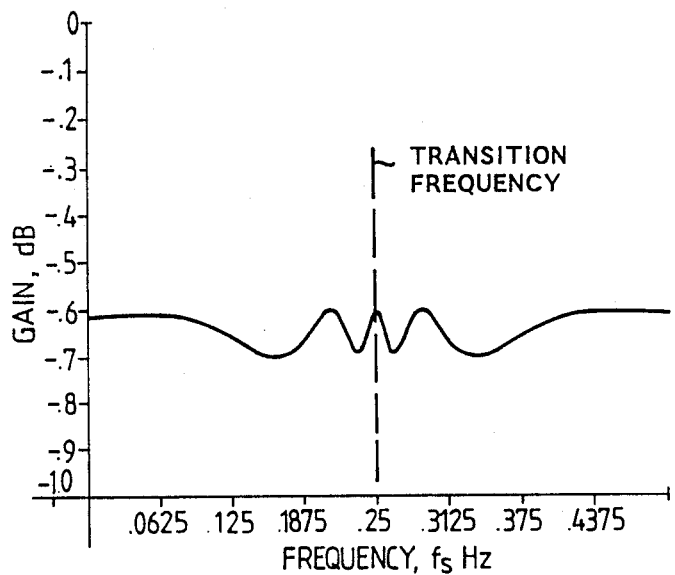
FIGS. 3a and 3b are amplitude and delay plots for the system of FIG. 1using filters having the characteristics of FIG. 2.
Figure 3B:
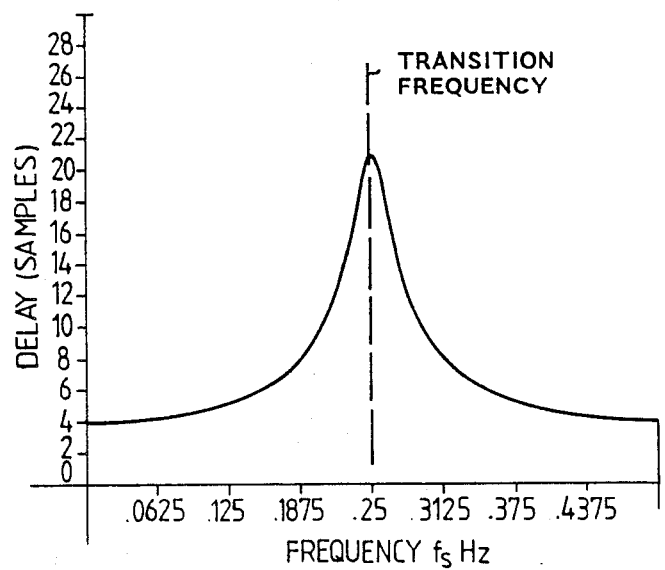

The "all-pass" response, measured after the recombination node of an SBC system using these filters, is shown in FIG. 3(a).

As mentioned previously, when using these recursive MF pairs, the signal delay at the SBC output will not be the same for all frequencies, whereas, with FIR designs flat delay can be guaranteed. The peak of delay in the recursive case can, however, be made substantially less than the system signal delay when using an FIR realization. A plot of the delay response at the SBC output, when using the half-band filters of FIG. 2, is shown in FIG. (3b). It can be seen that the peak of delay is around the centre of the band, corresponding to the transition regions of the filters. Hence, in multiband tree-structures, the peaks of delays in the various subbands will not coincide. Thus, with careful design, both the absolute delay and the overall delay ripple can be made small over a large part of the band.

Table 1 records features of a typical RMF scheme for relative assessment with a comparable FIR QMF design.

TABLE 1

Comparison of 2-band SBC Schemes using Quadrature and Non-quadrature MFs

| Filter Type | | FIR-QMF | RMF |
|---|---|---|---|
| Each Filter | No. of Poles | 0 | 6 |
| | No. of Zeros | 31 | 7 |
| | Stopband Attenuation | >38 dB | >39 dB |
| | Transition Bandwidth | ±.043$f_s$ | ±.043$f_s$ |
| System Processing Requirements | Multiplications at rate $f_s$ | 32 | 34 |
| | Temporary Storage | 62 | 27 |
| Complete System | Amplitude Ripple | ±.025 dB | ±.05 dB |
| | Delay Max. | 31/$f_s$ | 23/$f_s$ |
| | Delay Min. | 31/$f_s$ | 4/$f_s$ |

Non-quadrature mirror filters can be designed such that when used in SBC schemes the final output will be free of alias components, and approximate to an "all-pass" amplitude response. A particular feature of an SBC scheme using this class of filters is that the peak of the delay response will be reduced compared with the case when QMF pairs are used. The new class of filters have the additional advantage of being efficient in filter order. For a given filter amplitude response the order of the recursive filter will be typically one quarter of that of a comparable FIR realisation.

Whilst some improvement in output quality compared with the broadband coding case, can be achieved when using 2-band SBC schemes of this sort. But, in order to obtain significant improvement, a higher order of band-splitting is required. The filters for these multiband subband coder systems can be arranged as a branching cascade of 2-band schemes provided that the constituent filter pairs obey the above criteria (equations 3, 4 and 5). The special characteristics required of the various filters in such a scheme are outlined below.

The principles involved in the design of a reduced-delay SBC system are general, but a particular realization of an 8-band coder-decoder (codec) will be described here as an example. This codec is intended for use in the telephony-band (300–3400Hz), and is designed to meet the following requirements:
 1. The output of the SBC system should exhibit very little amplitude distortion (typically less than ×.2 dB ripple).
 2. The output should be free of frequency distortion (i.e. no alias frequency components).
 3. The processing networks should not introduce excessive signal delay (typically no more than a peak of 5 ms in total).
 4. The delay ripple should be kept small over the band 300–3400 Hz (e.g. no more than 2.5 ms delay variation over this band).

Tests have indicated that delay variations of this order do not affect speech quality, but it may be necessary to have flatter responses across the parts of the spectrum occupied by data signals. To achieve an efficient hardware solution, attention must also be paid to the number of multiplications and temporary storage elements required for the band-splitting and band-recombining networks.

Figure 4:
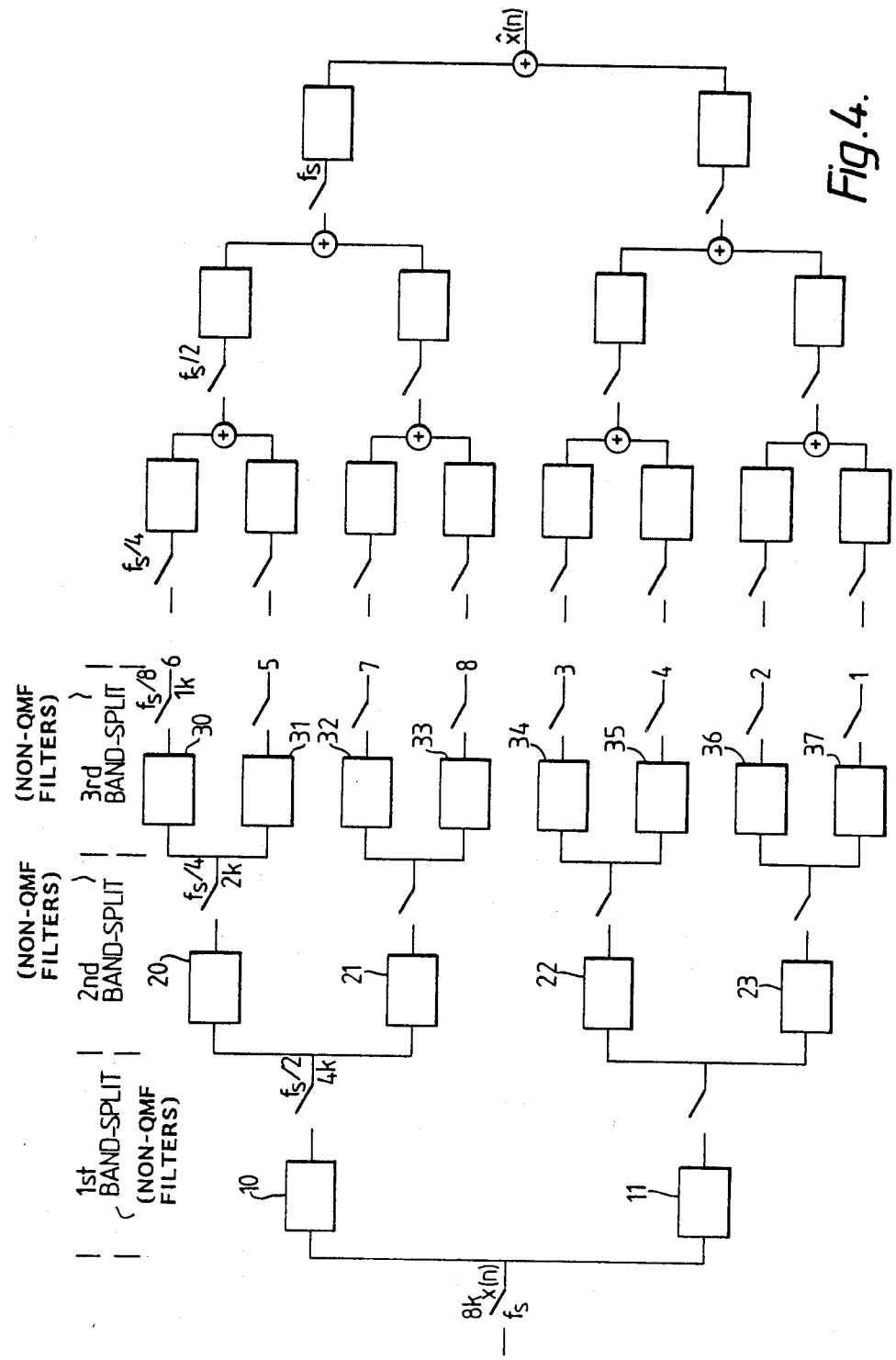
FIG. 4 shows an 8-band system.

FIG. 4 is a schematic of an 8-band SBC system. It can be seen that this configuration is a 3-tier nesting of the basic 2-scheme.

In prior designs the various pairs of mirror filters were constrained to have quadrature phase responses. This constraint simplified the design procedure, but, for a given amount of processing, resulted in a system with a less than optimum amplitude response. Additionally, the overall signal delay at the output may be unacceptable for some applications. A more efficient design can be achieved if the quadrature constraint is relaxed, because non-quadrature networks can result in reduced delay solution. Using these non-quadrature mirror filters the system output will still be alias free, because, the alias-cancelling criteria defined by equations 3, 4 and 5 are still adhered to.

In the 8-band scheme there are 3 sets of NON-QMF band-splitting filters, viz filters 10, 11; filters 20, 21, 22 and 23; and filters 30 to 37 and it will be shown how the characteristics of these filters can be tailored to make the overall system response meet the requirements laid down above. The specifications of the filters for a particular realization will be described, and it is suggested that, in general, near optimum solutions will have similar responses. In the description, the various sampling frequencies through the codec will be termed $f1_s$, $f2_s$ and $f3_s$, where $f1_s = 2\ f2_s = 4\ f3_s$.

(i) First band-splitting

Figure 5A:
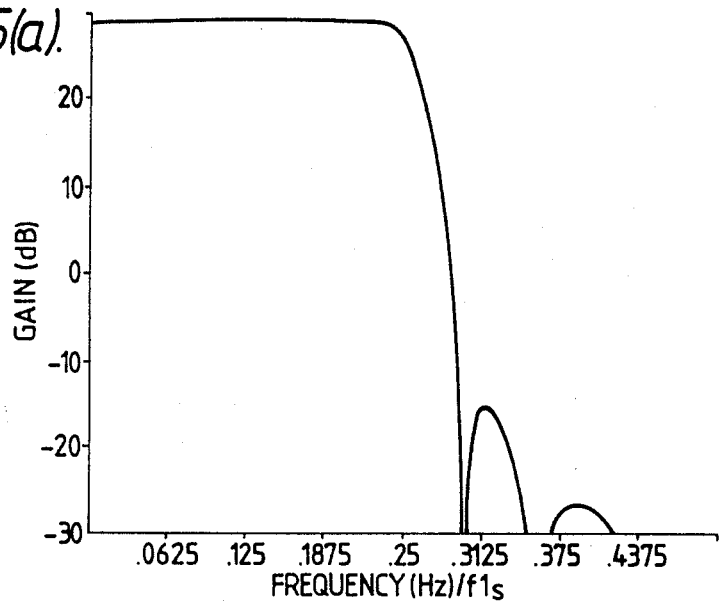
FIG. 5a is the amplitude response of the 1st stage lowpass filter of the system of FIG. 2.
Figure 5B:
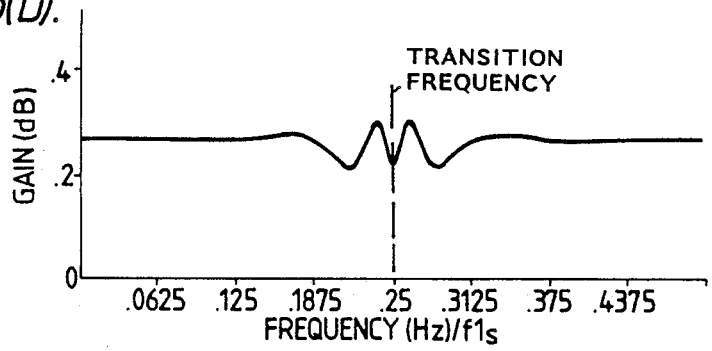
FIG. 5b and 5c are the amplitude and delay response contributions of the first stage filtering to the system output (i.e. the response of a two-band system using those filters)
Figure 5C:
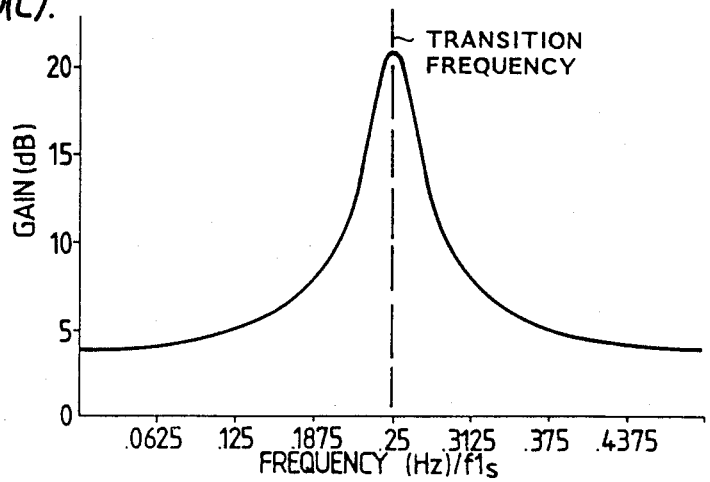

The first pair of band-splitting filters 10,11 should have passband-to-stopband transition regions of approximately $\pm 0.045\ f1_s$, and a minimum stopband rejection of about 40 dB. The filters in out solution achieve 40 dBs attenuation by $0.25 \pm 0.043\ f1_s$, and exhibit much more rejection in the rest of the stopband. In order that the delay requirements be met, the peak of delay introduced by this level of band partitioning and recombining should be in the region of 20 sample periods. In our realization we chose a pair of filters which resulted in a maximum of 21 samples and a minimum of 3.8 samples delay at the codec output. The delays at $0.25 \pm 0.125\ f1_s$ are 5 samples. FIGS. 5(*a*), 5(*b*) and 5(*c*) show respectively the amplitude response of the lowband filter 11, the resulting amplitude response contribution to the complete system output, and the delay response contribution at the codec output.

(ii) Second band-splitting

After the down-sampling at the outputs of the first band-splitting filters, the signal paths are further split and then processed by the second bank of band-splitting filters 20–23. As the sampling rate has been reduced, the transition regions of these filters can be broadened with respect to the sampling rate $f2_s$. In addition, a relaxed stopband performance is possible with these filters compared with the previous case, because the interband signal level variance is likely to be smaller now that the individual subbands cover less of the original broadband frequency spread. A transition region of around $\pm 0.07\ f2_s$ and a stopband rejection of about 32 dBs is likely to be adequate. The filters used in our realization have achieved over 30 dBs attenuation by $0.25 \pm 0.0625\ f2_s$, and over 35 dBs by $0.25 \pm 0.07\ f2_s$.

The reduced sampling rate does mean, however, that the acceptable number of sample period delays at each subband recombination node is reduced compared with the previous case. A peak delay of approximately 11 sampling periods would be consistent with meeting the delay requirements quoted. In our realization the peaks of delay were $11.25/f2_s$ and the minima were $3/f2_s$. Translating these to delay at the original sampling frequency, $f1_s$, we have a maximum of 22.5 samples and a minimum of 6 samples.

Figure 6A:
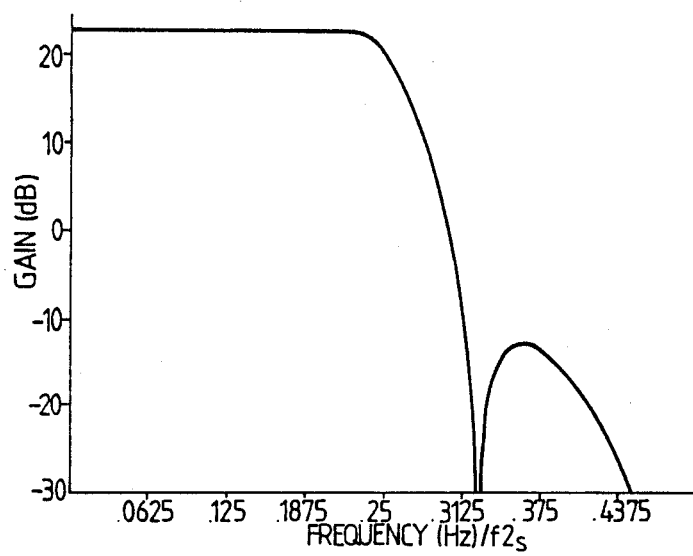
FIG. 6a is the amplitude response of the second stage lowpass filter.
Figure 6B:
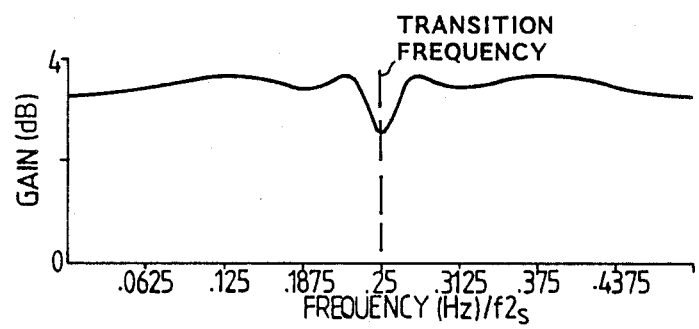
FIG. 6b is the amplitude response contribution of the second stage filtering to the system output (i.e. the response of a two-band system using those filters)
Figure 6C:
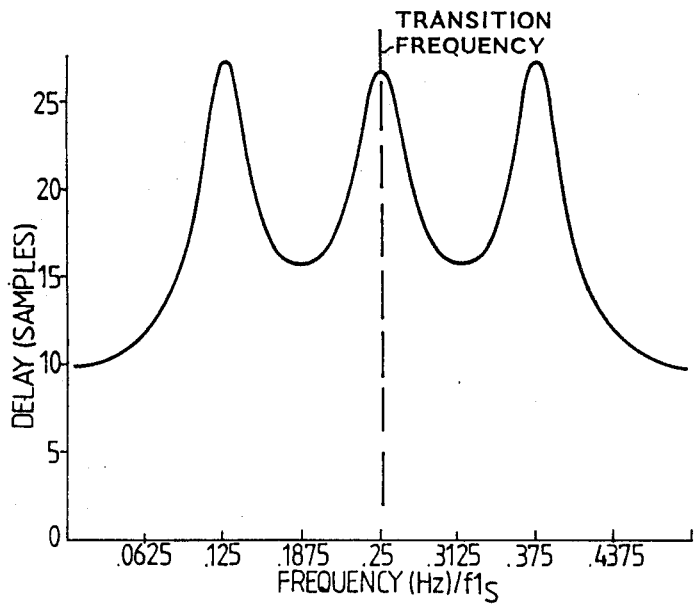
FIG. 6c is the delay response contribution of the first and second state filtering (i.e. the response of a 4-band system using them)

FIGS. 6(*a*), 6(*b*) and 6(*c*) show respectively the amplitude responses of the low-band filters, the resulting amplitude response contribution to the complete system at the codec output, and the combined delay response contributions of the first pair of subbands and these second two pairs.

The point to note is that the delay response now has three roughly equal peaks across the band of interest. However, the delay ripple is considerable. Thus an attempt should be made to minimize this ripple in the final bank of subband processing.

(iii) Third band-splitting

Examining the delay ripple introduced by the previous two stages of subband processing it can be seen that the delay ripple across the final set of subbands needs to be of the order of $12/f1_s$. But, because $f3_s = f1_s/4$, this translates to a preferred delay variation across these component bands of around $3/f3_s$.

Again, a slightly wider transition-band can be tolerated with these filters, but it is suggested that for a good quality output this regions should be kept below $\pm 0.1\ f3_s$.

Figure 7A:
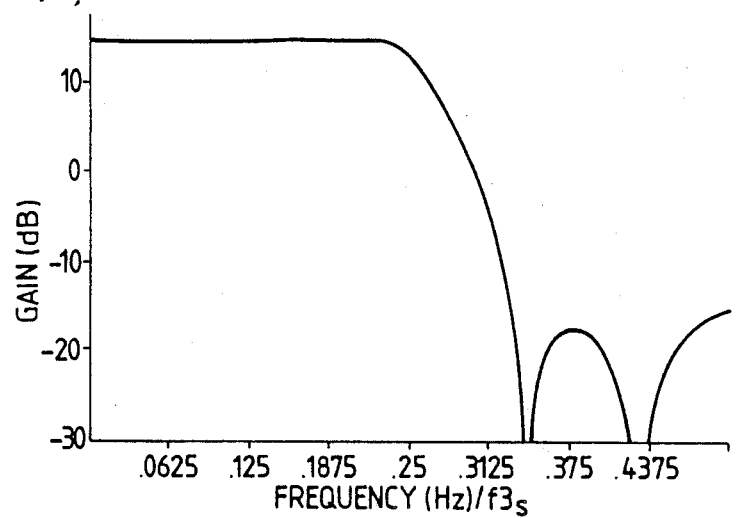
FIG. 7a is the amplitude response of the third stage lowpass filter.
Figure 7B:
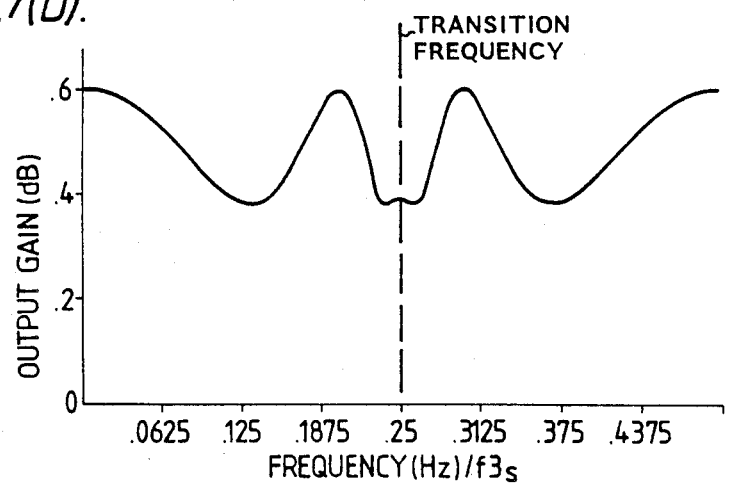
FIG. 7b is the amplitude response of the third stage filters when used in a two-band system.
Figure 7C:
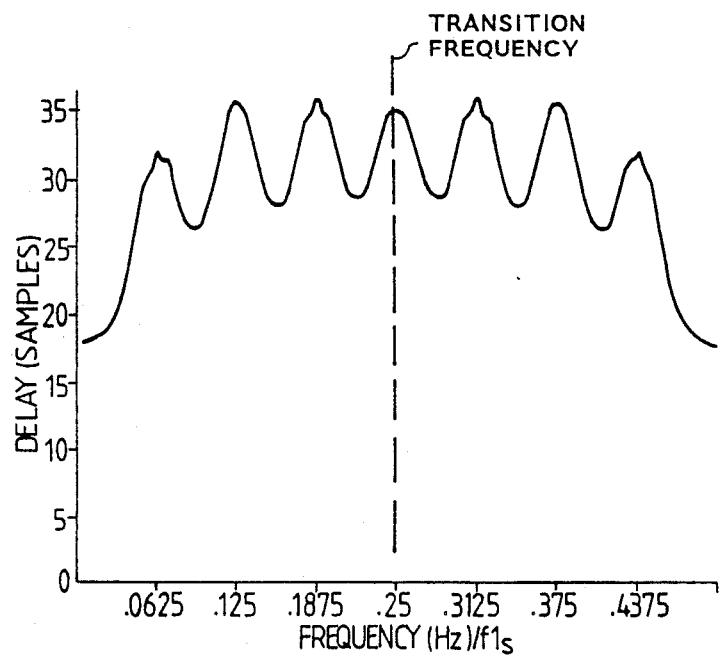
FIG. 7c is the unequalized delay response of the 8-band system.

FIG. 7(*a*) shows the amplitude response of the lowpass filters 31, 33, 35, 37 used in our realization. The stopband rejection is greater than 30 dBs, and this is achieved by $0.25 + 0.8\ f3_s$. FIG. 7(*b*) is a plot of the amplitude response contribution that this stage of processing makes to the final codec output. FIG. 7(*c*) is the delay response of the complete system. It should be noted that the residual delay ripple is highly regular and, in consequence, can be equalized with a low-order polyphase all-pass network.

Only the lowpass filter(s) of each stage have been described: the highpass filters and the interpolation filters in the decoder are derived from these using equations 3, 4 and 5.

Figure 8:
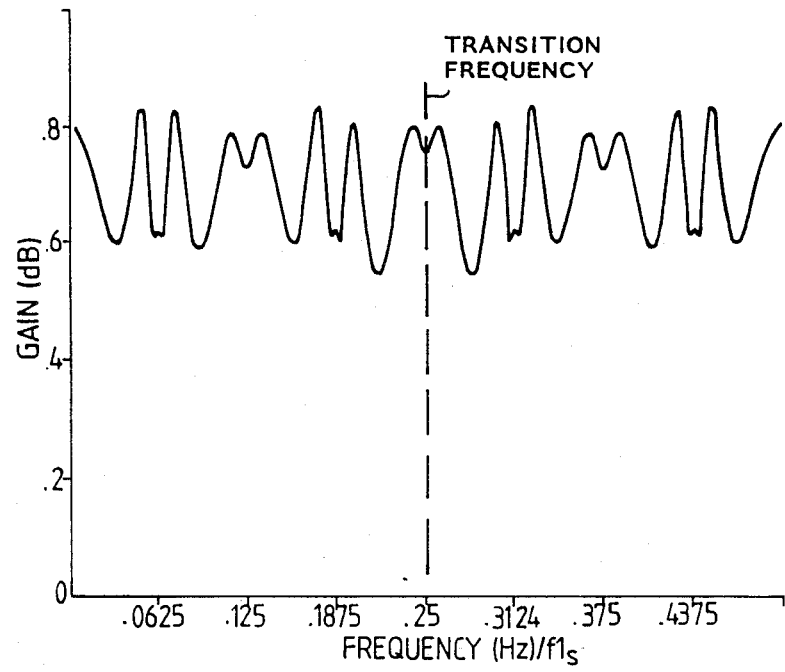
FIG. 8 is the amplitude response of the 8-band system.
Figure 9:
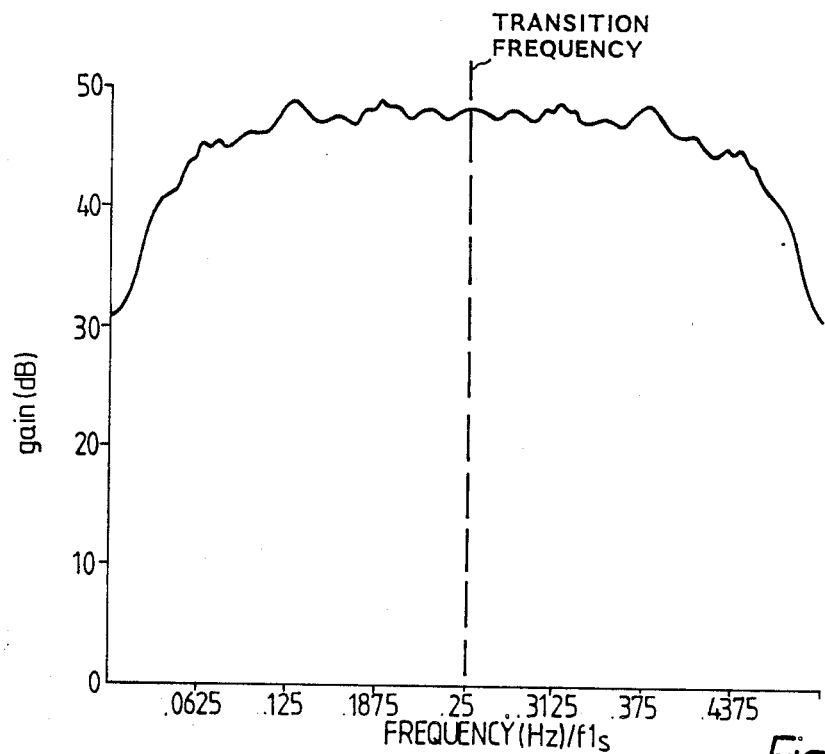
FIG. 9 is the equalized delay response of the 8-band system.

FIGS. 8 and 9 are included for completeness, FIG. 8 is the amplitude response of the 8-band SBC output, and FIG. 9 is the delay response that can be achieved using a 1st-order polyphase equalizer.

The plots in FIGS. 8 and 9 show that all the specifications outlined above have been met by this specimen 8-band SBC design using non-quadrature mirror filters. It can be seen that the output signal has a $\pm 0.125$ dB amplitude ripple. The peak delay of 36 sample periods corresponds to 4.5 ms, assuming a sampling-rate of 8000 samples/s. The delay variation across the complete band is 2.5 ms, but there is only $\pm 0.5$ ms delay ripple in the band 1000–3000 Hz. An FIR realization, with roughly equivalent filter transition bandwidths, amplitude ripple and stopband rejections was used as a 'yardstick' with which to compare the performance of the new design. This FIR implementation introduces a constant amount of signal delay at all frequencies. However, the absolute value of the delay is 13.125 ms, nearly three times as much as with the recursive NQMF design.

The amount of processing required to realize the filters also compared favourably with the FIR yardstick. Both needed approximately 36 multiplications at the input sampling rate to obtain the eight subband outputs, but the recursive realization only required 60 temporarily stored variables, compared with 105 for the FIR implementation.

Figure 10:
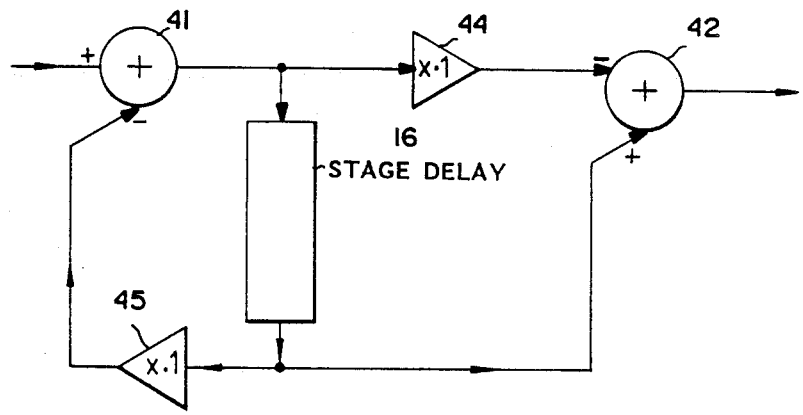
FIG. 10 is a circuit of an all-pass equalization network.

The 1st order polyphase equalization filter used to obtain the results of FIG. 9 is shown in FIG. 10, and comprises a 16-sample delay 40, two adders 41, 42, and two multipliers 43, 44 having coefficients of 0.1. It is not considered necessary when the equipment is used for speech transmission, but it may be required if data is to be passed over the channel, delay variations with frequency can give rise to intersymbol interference. The inclusion of this equalization network brings the delay ripple down to less than ±0.15 ms across the part of the spectrum used for data transmission. It does, however, increase the absolute delay by about 2 ms, but still results in a delay of less than half the FIR case.

From the above description it will be seen that use is made of three stages of band splitting having minimum peak delays of approximately, 20, 10 and 3 samples respectively (because the sampling rates are progressively reduced the delay times are of the same order). The delays are selected to provide the equi-ripple response referred to in the introduction. In fact, in the example quoted, a 1st stage filter was designed with only a 16 sample delay but redesigned to 20 in order to "match" the delay of the second stage filtering so as to achieve the equi-ripple response.

Moreover, the stages of band splitting become of progressively lower order and hence the relative width of the transition bands becomes greater and out of band rejection becomes less; this is not objectionable since cross-band quantization noise becomes subjectively less troublesome as the bands become closer together because of auditory masking properties of human audio perception.

In general, IIR filters are preferred for computational efficiency, but minimum phase (but not linear phase) FIR filters may be used in some circumstances especially in the later stages where the filters are of lower orders.

Using processing schemes as described above it is possible to design subband coder systems that are efficient in their processing requirements, and have the added advantage of introducing very little delay into the signal path. One of the more important features of the scheme is that it can result in signal path delays that are essentially constant over the major part of the frequency spread of the broadband signal. In all cases the absolute value of the delay and the delay/frequency ripple of the complete system can be traded-off against the stopband attenuation, passband amplitude ripple, and the width of the passband-to-stopband transition region. The particular scheme outlined here is likely to be useful for many SBC telephony applications.

I claim:
1. A sub-band coder comprising:
(a) an input means for receiving signal samples;
(b) first filter means, supplied from said input means, for passing frequencies above a transition frequency;
(c) second filter means, supplied from said input means, for passing frequencies below said transition frequency;
(d) first downsampling means for downsampling the output of said first filter means; and
(e) second downsampling means for downsampling the output of said second filter means; wherein:
(f) the amplitude response of said first filter means is a mirror image, about said transition frequency, of the amplitude response of said second filter means;
(g) the delay response of said first filter means is a mirror image, about said transition frequency, of the delay response of said second filter means;
(h) said first and second filter means are not quadrature filters; and
(i) the delay response of each filter means with respect to frequency is non-constant.

2. A sub-band coder according to claim 1 in which the first and second filter means are minimum phase response filters.

3. A sub-band coder according to claim 1 or 2, in which the delay responses of the first and second filter means have maxima respectively above and below the transition frequency.

4. A sub-band coder according to claim 1 or 2 in which said first and second filter means are recursive filters.

5. A sub-band coder according to claim 1 for providing $2^N$ sub-bands, where N is a positive integer further comprising M further pairs of filter means, each filter means being followed by a downsampling means, where $$M = \sum_{i=1}^{N-1} 2^i$$

the input of each such further pair of filter means being connected to the output of a downsampling means.

6. A decoding apparatus comprising:
a. input means for receiving as inputs first and second sub-band coded sampled signals;
b. first unsampling means for receiving said first sub-band coded sampled signals from said input means for increasing the sampling rate of said first signals;
c. second upsampling means for receiving said second sub-band coded sampled signals from said input means for increasing the sampling rate of said second signals;
d. first filter means, supplied from the output of the first upsampling means, for passing frequencies above a transition frequency;
e. second filter means, supplied from the output of the second unsampling means, for passing frequencies below said transition frequency;
f. means for combining the outputs of the first and second filter means, wherein;
g. the amplitude response of said first filter means is a mirror image, about said transition frequency, of the amplitude response of said second filter means;
h. the delay response of said first filter means is a mirror image, about said transition frequency, of the delay response of said second filter means;
i. said first and second filter means are not quadrature filters; and
j. the delay response of each filter means with respect to frequency is non-constant.

7. A decoding apparatus according to claim 6 further comprising second and third decoding apparatus according to claim 6 wherein one of the said inputs of the decoding apparatus is supplied from the means for combining of said second decoding apparatus and the other one of said inputs is supplied from the means for combining of said third decoding apparatus.

8. A sub-band decoder according to claim 6 in which the first and second filter means are minimum phase response filters.

9. A sub-band decoder according to claim 6, 7 or 8 in which the delay responses of the first and second filter means have maxima respectively above and below the transition frequency.

10. A sub-band decoder according to claim 6, 7 or 8 in which said first and second filter means are recursive filters.

11. A transmission system comprising a sub-band coding means including:
- an input for receiving signal samples;
- a first coder filter means supplied with signal samples from said input, for passing frequencies above a transmission frequency;
- a second coder filter means supplied with said signal samples from said input, for passing frequencies below said transition frequency;
- downsampling means for downsampling the output of said first filter means;
- downsampling means for downsampling the output of said second filter means; and
- sub-band decoding means including:
- input means for receiving the downsamples output signals from said first and second filter means;
- first upsampling means for increasing the sampling rate of said first signals;
- second upsampling means for increasing the sampling rate of second signals;
- first decoder filter means, supplied from the output of the first upsampling means, for passing frequencies above said transition frequency;
- second decoder filter means supplied from the output of the second upsampling means, for passing frequencies below said transition frequency; and
- means for combining the outputs of the first and second decoder filter means; wherein:
- the amplitude response of said first coder and decoder filter means is a mirror image, about said transition frequency of the amplitude response of said second coder and decoder filter means, respectively;
- the delay response of said first coder and decoder filter means is a mirror image, about said transition frequency of the delay response of said second coder and decoder filter means, respectively,
- said first and second coder filter means are not quadrature filters and said first and second decoder filter means are not quadrature filters; and the delay response of each filter means with respect to frequency is non-constant.

12. A transmission system according to claim 11, wherein said decoding means is coupled to a polyphase all-pass filter for equalizing the delay response of the transmission system.

13. A sub-band coder comprising:
(a) an input means for receiving signal samples;
(b) first filter means, supplied from said input means, for passing frequencies above a transition frequency;
(c) second filter means, supplied from said input means, for passing frequencies below said transition frequency;
(d) first downsampling means for downsampling the output of said first filter means; and
(e) second downsampling means for downsampling the output of said second filter means; wherein:
(f) the amplitude response of said first filter means is a mirror image, about said transition frequency, of the amplitude response of said second filter means;
(g) the delay response of said first filter means is a mirror image, about said transition frequency, of the delay response of said second filter means such that the first and second filter means have delay responses which are mirror images of each other and asymmetrical about the transition frequency;
(h) said first and second filter means have asymmetrical delay responses about the transition frequency; and
(i) the delay response of each filter means with respect to frequency is non-constant.

* * * * *